June 8, 1965 NOBUTOSHI KIHARA 3,188,385

MAGNETIC RECORDING AND REPRODUCING SYSTEM

Filed June 15, 1962

Inventor
Nobutoshi Kihara
Hill, Sherman, Meroni, Gross & Simpson
Attys.

United States Patent Office 3,188,385
Patented June 8, 1965

3,188,385
MAGNETIC RECORDING AND REPRODUCING SYSTEM

Nobutoshi Kihara, Shibuya-ku, Tokyo, Japan, assignor to Sony Corporation, Tokyo, Japan, a corporation of Japan Filed June 15, 1962, Ser. No. 202,742
Claims priority, application Japan, June 21, 1961, 36/22,136
9 Claims. (Cl. 178—6.6)

This invention relates to a signal transducing system and particularly to such a system wherein signals such as video signals are recorded or reproduced by scanning along oblique magnetic tracks on a magnetic record medium.

Magnetic recording systems in which magnetic tracks are formed on a magnetic record medium transversely to the direction of movement of the record medium are well-known. In one prior art system of magnetic recording the magnetic tracks extend from one side edge of the record medium to the other side edge at an acute angle to the direction of movement of the record medium. By way of example, if two heads are utilized, one head records one skew magnetic track on the record medium after which the second head records a second magnetic track which is in direct alignment with the first magnetic track with respect to the direction of movement of the record medium. The successive tracks produced by the respective heads are all in longitudinal alignment along the record medium and form a single record zone.

An important concept of the present invention resides in the provision of a transducing system in which signals are recorded along oblique record tracks in two or more laterally adjacent record zones on a record medium by means of respective recording heads rotating on a common axis but in separate planes. In one embodiment in accordance with the present invention, two moving magnetic transducer heads scan along successive oblique lines at respective laterally offset record zones of a moving magnetic record medium.

Another important concept of the present invention is to provide a transducing system in which the synchronizing component of a composite signal is recorded along successive skew lines in one record zone and other signal components exclusive of such synchronizing component are recorded as skew lines in another laterally adjacent record zone.

It is therefore, an important object of the present invention to provide a transducer system in which signals having synchronizing components are conveniently recorded and reproduced.

Another object of the invention is to provide an extremely simple and effective video tape recorder in which television signals including the synchronizing components thereof are magnetically recorded and reproduced.

A further object of the invention is to provide a magnetic recording and reproducing system utilizing a plurality of rotating magnetic heads which does not require the use of a switching device to control sequential activation of the heads.

A still further object of the invention is to provide a relatively small and compact portable video tape recorder.

Other objects, features and advantages of this invention will become apparent from the following detailed description taken in connection with the accompanying drawing in which.

Figure 2:
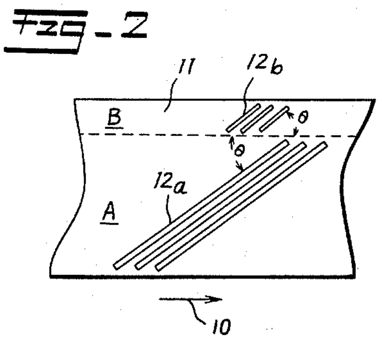
PRIOR ART FIG. 2
FIGURE 2 is a partial elevational view of a magnetic tape illustrating diagrammatically the formation of skew magnetic tracks at two laterally offset record zones in accordance with the present invention.
Figures 3, 4:
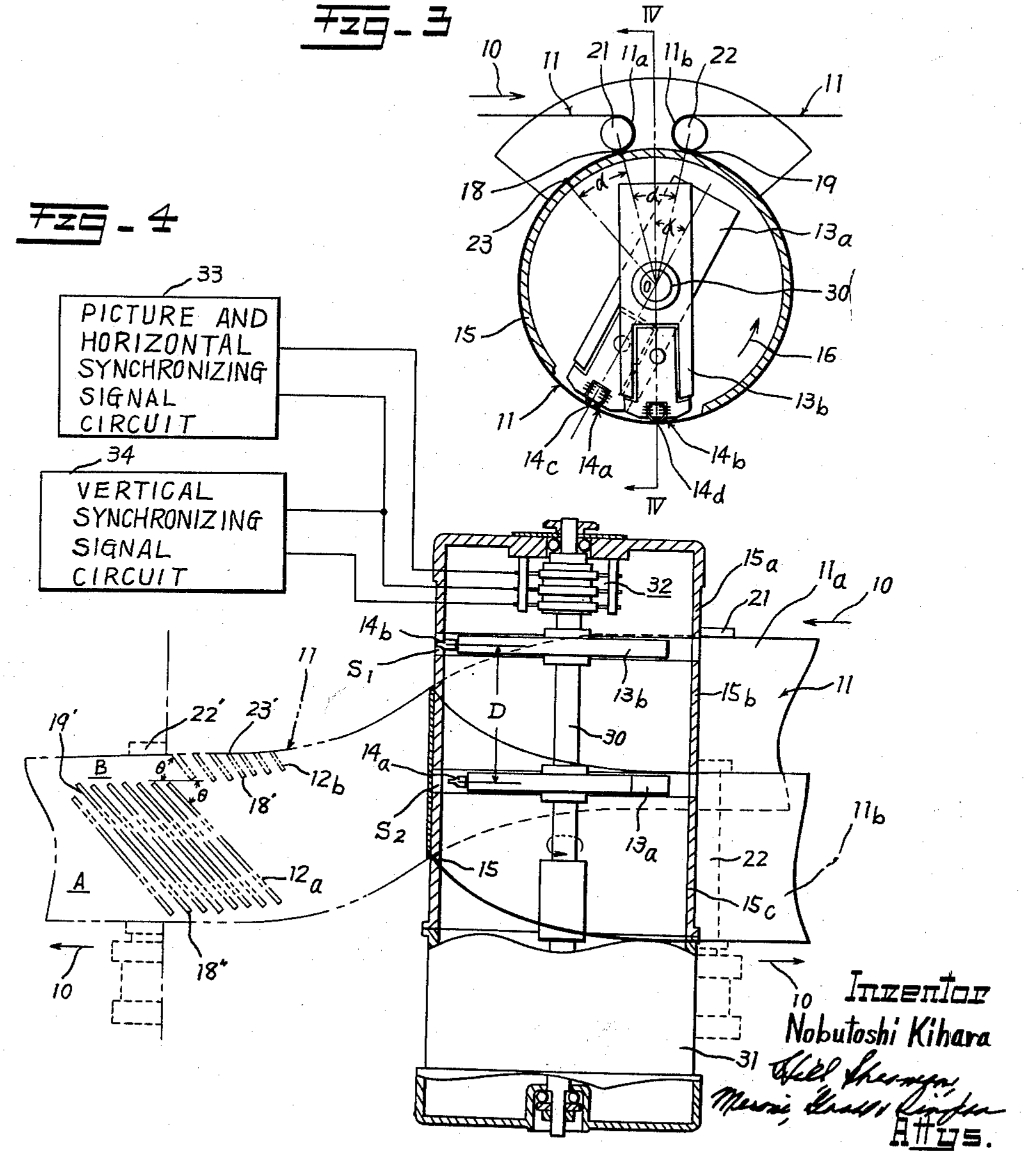

FIGURE 3 is a somewhat diagrammatic horizontal sectional view illustrating a transducer system in accordance with the present invention for producing or playing back records such as indicated in FIGURE 2; and FIGURE 4 is a somewhat diagrammatic vertical sectional view taken along the line IV—IV of FIGURE 3 and illustrating in dash outline a development of a portion of the magnetic tape associated with the structure.

Figure 1:
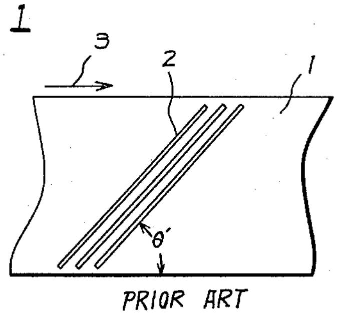
FIGURE 1 is a partial elevational view of a magnetic tape illustrating diagrammatically a series of skew magnetic tracks forming a single record zone as is produced by prior art systems.

FIGURE 1 illustrates a magnetic record medium 1 having a series of magnetic record tracks 2 recorded thereon which extend across the entire width of the record medium obliquely to the direction of movement of the record medium indicated by the arrow 3. The magnetic tracks 2 may be recorded by means of a single rotating head or may be produced by a plurality of magnetic heads which scan successive tracks in sequence. In either event, the successive tracks are formed in direct longitudinal alignment so as to constitute what will be termed herein a single record zone.

FIGURE 2 illustrates a record medium for use in a recording or reproducing system in accordance with the present invention. In FIGURE 2, a record medium 11 is illustrated which may comprise an elongated magnetic tape movable in the direction of arrow 10. The record medium has recorded thereon a first series of magnetic tracks *12a* and a second series of magnetic tracks *12b* extending obliquely to the direction of movement of the record medium and occupying two laterally offset record zones A and B, respectively. Preferably, the record zone B contains primarily the recorded synchronizing component of a composite signal while the other record zone A preferably contains the signal components other than the synchronizing component recorded in zone B. The composite signal recorded on the record medium 11 may be a television signal, for example, including horizontal and vertical synchronizing components and a succession of fields or frames of a picture signal. The vertical synchronizing signals occur in the vertical blanking periods between the successive fields or frames of the television signal and occur at substantially uniform time intervals.

In the illustrated embodiment, vertical synchronizing signals occurring during the vertical blanking periods are recorded in the record zone B while the picture components of the television signal exclusive of the vertical synchronizing signals but including the horizontal synchronizing signals are recorded in the record zone A.

In the illustrated embodiment, the free ends of rotary arms *13a* and *13b* carry respective magnetic heads *14a* and *14b*. The rotary arms are secured to a rotary shaft 30 as best seen in FIGURE 4 with an axial spacing between the arms indicated at D. The magnetic heads may be of conventional construction comprising loop magnetic circuits with longitudinal non-magnetic gaps located as indicated at *14c* and *14d* for coupling to the magnetizable material of the record medium. The heads may each have pole pieces at opposite sides of the gap which are spaced longitudinally with respect to the direction of movement of the heads and are in sliding contact with the active surface of the magnetic record tape 11 over a predetermined portion of the angular travel in each revolution. The heads thus record longitudinal magnetic fields which extend in the scanning direction along the magnetic tracks *12a* and *12b*, respectively.

Referring to FIGURE 3, the heads may rotate in the counterclockwise direction as indicated by arrow 16 and the head *14b* may lead the head *14a* by an acute angle alpha ($\alpha$) which is proportional to the vertical blanking period. That is the heads will travel through the angular distance alpha in a time interval equal to the duration of the vertical blanking period. The heads rotate in synchronism with the television signal and preferably make a complete revolution in the time interval from the beginning of one field of the television signal to the beginning of the next field of the television signal so that each track such as 12*a* in FIGURE 2 contains the information corresponding to one field of the television signal. The proportion of the scanning path across the record tape occupied by the track 12*b* in FIGURE 2 is determined in accordance with the ratio of the vertical blanking period to the total interval between successive fields of the television signal. The angle alpha shown in FIGURE 3 is usually less than 36°. That is, the blank interval is usually less than 10% of the time from the start of one field to the start of the next field. A cylindrical guide drum 15 is provided coaxially with the rotary shaft 30. The guide drum consists of three portions 15*a*, 15*b*, 15*c*, FIGURE 4, having successive slots S1 and S2 therebetween which receive the respective magnetic heads 14*b* and 14*a*. As seen in FIGURES 3 and 4, the polar surfaces of the heads 14*a* and 14*b* lie substantially flush with the exterior surface of the drum 15 so as to be in suitable sliding contact with the active surface of the magnetic tape 11 where the paths of the respective heads intersect the path of the tape. As seen in FIGURE 4, the slots S1 and S2 lie in planes at right angles to the shaft 30 and have a width somewhat greater than the width of the respective magnetic heads so as to freely receive the magnetic heads therein.

The shaft 30 is connected to the shaft of a motor 31, FIGURE 4, and the motor 31 has its casing secured to the guide drum 15 which is stationary. The record medium, namely the magnetic tape 11, travels about the outer peripheral surface of the guide drum 15 between the points 18 and 19 indicated in FIGURE 3. Guide rollers 21 and 22 are diagrammatically indicated at the entering portion of the tape path about drum 15 and at the departing portion of the tape path about the drum, respectively. The tape travels in the direction of arrow 10 toward and about the entering guide roller 21, then about the stationary surface of the drum 15 and then around and away from the departing guide roller 22. The heads are indicated as rotating in the direction of arrow 16 which is in the same direction generally as the direction of movement of the tape, although the tape path about the drum is at an acute angle to the planes of the heads as will be seen in FIGURE 4.

The guide rollers 21 and 22 are offset axially of the drum 15 by a distance less than the width of tape 11 as w will be seen in FIGURE 4 so that the entering portion of the tape 11*a* is offset vertically by a distance somewhat less than the tape width with respect to the departing portion 11*b* of the tape. The position of the departing guide roll 22 and of the departing portion 11*b* of the tape have been indicated in dash outline in FIGURE 4 so as to clearly indicate the oblique path of the tape along the surface of the guide drum 15. The portion of the tape extending from a point in axial alignment with head 14*b* to departing guide roller 22 has also been illustrated in developed form in FIGURE 4 in dash outline to illustrate the actual orientation of the record tracks 12*a* and 12*b* in relation to the structure of FIGURE 4. It will be understood that the record tracks 12*a* and 12*b* will lie substantially in horizontal planes when the guide drum 15 has an upright orientation as illustrated in FIGURE 4.

It will be noted from FIGURE 4 that, with the magnetic heads having an angular separation as shown at FIGURE 3, the head 14*b* will be out of contact with the magnetic tape while the head 14*a* is in contact with the magnetic tape and tracing a track such as indicated at 12*a* in FIGURES 2 and 4. When the head 14*a* reaches point 19 seen in FIGURE 3, the head 14*a* will travel out of contact with the magnetic tape until the head 14*a* reaches point 18. This interval in the travel of the head 14*a* will occur during the vertical blanking period. At the same time, the head 14*b* will be traveling from point 18 in FIGURE 3 to point 23 and will be in contact with the upper portion or zone B of the magnetic tape to record the vertical synchronizing portion of the signal along one of the tracks 12*b*. As the head 14*b* travels beyond 23 in FIGURE 3, the head 14*b* will move out of contact with the magnetic tape as can be seen by comparing FIGURES 3 and 4. Thus, the angular separation between points 19 and 18 and between points 18 and 23 may correspond to the angular separation alpha between heads 14*b* and 14*a*.

In the development view of the tape in FIGURE 4, the points 18′ and 23′ associated with one of the tracks 12*b* may represent the path of travel of the head 14*b* on the surface of the magnetic tape as it moves from point 18 to point 23 as viewed in FIGURE 3 while the points 18″ and 19′ associated with one of the tracks 12*a* may indicate the path of travel of the head 14*a* as it moves from point 18 to point 19 as viewed in FIGURE 3. Thus during the scanning process, head 14*b* scans from point 18′ to point 23′ on tape 11 after which head 14*a* scans from point 18″ to point 19′. This process is repeated for each of the successive tracks of the record zones A and B.

The reference numeral 32 designates a slip ring assembly for connecting the rotating magnetic heads with external circuitry such as components 33 and 34 indicated in FIGURE 4. Where the heads are arranged to contact the magnetic tape only at the desired recording or active intervals thereof, the slip rings may connect head 14*a* continuously with component 33 and may connect the head 14*b* continuously with component 34. No commutating device for switching from one head to the other is necessary.

*Summary of operation*

In operation, during recording the magnetic heads 14*a* and 14*b* are rotated in synchronism with the field or frame rate of the video signal to be recorded. The picture and horizontal synchronizing signals are supplied to head 14*a* and the vertical synchronizing signals are supplied to head 14*b*. Only one of the heads is in contact with the magnetic tape at a given instant of time. Thus, as the head 14*a* rotates from point 18 as as seen in FIGURE 3 to point 19, the head 14*b* is out of contact with the magnetic tape, while as the magnetic head 14*b* moves from point 18 to point 23 as seen in FIGURE 3, the head 14*a* will be moving from point 19 to point 18 and will be out of contact with the magnetic tape. The rotation of the magnetic heads is such that the head 14*b* moves from point 18 to point 23 during the vertical blanking period and records vertical synchronizing pulses along one of the tracks 12*b* in the record zone B, FIGURE 2, while during the remainder of the cycle, the head 14*b* is out of contact with the magnetic tape and the head 14*a* is recording the picture signal together with the horizontal synchronizing signals along one of the tracks 12*a*, FIGURE 2.

During playback of a recorded signal, the motor 31, FIGURE 4, rotates shaft 30 so that head 14*b* scans one of the tracks 12*b* as it moves from point 18 to point 23 as viewed in FIGURE 3, after which the head 14*a* scans one of the tracks 12*a* as the head 14*a* moves from point 18 to point 19 in the counterclockwise direction as viewed in FIGURE 3. By proper synchronization of the head movement with the movement of the tape 11 in the direction of arrow 10, the heads 14*a* and 14*b* will scan the successive tracks 12*a* and 12*b* respectively to reproduce the recorded television signal including vertical synchronizing pulses from the tracks 12*b* and the picture signals and horizontal synchronizing pulses from the tracks 12*a*. It will be appreciated that all of the tracks 12*a* in the record zone A are scanned by the magnetic head 14*a* alone while the tracks 12*b* in the zone B are scanned by the head 14*b* alone.

As is well known, control tracks and audio signal tracks can be recorded along the opposite margins of the tape 11 by conventional methods, and such control tracks may include means for synchronizing the scanning process during playback.

A feature of the present invention is that where the speed of movement of the record medium and other conditions are the same, the tracks 12*a* and 12*b* may extend at an angle theta ($\theta$) with respect to the direction of movement of the record medium which is substantially less than the angle $\theta'$ of the magnetic tracks which is possible in the prior art system shown in FIGURE 1. In other words, the angle which the center line of the tape makes with respect to a plane at right angles to the shaft 30 in FIGURE 4 may be less with the structural relationships of the present invention. The result is that the supply and take-up reels (not shown) for the tape 11 may lie closer to the same plane; thus the device of the present invention may be more compact. Further, since only one of the heads is required to record the television signals namely head 14*a*, the characteristics of the two heads need not be the same. The head 14*b* for recording the vertical synchronizing signal need not be of the high quality required for the head 14*a*. Additionally, in the present invention it is not necessary to switch the external circuitry from one of the heads to the other during each cycle since the structural arrangement of the heads themselves in relation to the path of the record medium automatically carries out the switching function.

It will be apparent that many modifications and variations may be effected without departing from the scope of the novel concepts of the present invention.

What is claimed is:

1. The method of transducing a composite signal including a signal part and a synchronizing part occurring alternately in time wihch is characterized by moving a pair of transducer heads along paths extending obliquely across respective first and second record zones of a record medium at a skew angle to the direction of movement of the record medium, bringing a first one of the heads into scanning relation to the first zone for a first part of each scanning cycle to transduce the synchronizing part of the composite signal and bringing a second one of said heads into scanning relation to the second zone during a second part of each scanning cycle to transduce the signal part of the composite signal.

2. In a magnetic transducing system, a magnetic record medium for movement in a longitudinal direction and having two magnetic record zones extending longitudinally along the record medium in transversely offset relation, said zones having respective magnetic tracks therein extending at skew angles to the direction of movement of the record medium, one of said zones having mainly synchronizing signals recorded thereon and the other of said zones having signals other than said synchronizing signals mainly recorded thereon, and a pair of rotating heads scanning the respective record zones and arranged relative to each other and relative to said record medium so that said heads scan the successive magnetic tracks of the respective zones alternately to reproduce the signals recorded thereon.

3. In a magnetic transducing system, a magnetic record medium for movement in a longitudinal direction and having two magnetic record zones extending longitudinally along the record medium in transversely offset relation, said zones having respective magnetic tracks therein extending at skew angles to the direction of movement of the record medium, one of said zones having mainly synchronizing signals recorded thereon and the other of said zones having signals other than said synchronizing signals mainly recorded thereon, a pair of rotary magnetic heads scanning the respective record zones, the record medium being formed into a curved configuration conforming with the rotary paths of said heads, and means whereby one of said heads is in operative relation to said record medium at said one zone thereof and then is out of operative relation to said record medium and the other of said heads is out of operative relation to said record medium while said one of said heads is in operative relation to said record medium and whereby said other of said heads is in operative relation to said record medium at said other of said zones while said one of said heads is out of operative relation to said record medium.

4. In a magnetic transducing system, a magnetic record medium for movement in a longitudinal direction and having two magnetic record zones extending longitudinally along the record medium in transversely offset relation, said zones having respective magnetic tracks therein extending at skew angles to the direction of movement of the record medium, one of said zones having mainly synchronizing signals recorded thereon and the other of said zones having signals other than said synchronizing signals mainly recorded thereon, a pair of rotary heads scanning the respective record zones, the record medium being formed into a loop conforming to the paths of the heads for a part only of one revolution of the heads, the entering part of the record medium leading into the loop being offset from the departing part of the record medium leading from the loop in a direction transverse to the general plane of the loop, and the heads being offset from each other in the transverse direction so that one head is in coupling relation with the record medium during a part only of its rotary movement and is transversely offset from the record medium loop during a further part of its rotary movement, and the other head travels in the open part of the record medium loop between the entering and departing parts of the record medium while the first head is in coupling relation to the record medium.

5. A magnetic recording and reproducing system comprising a magnetic medium, a rotary shaft, two rotary magnetic heads mounted at different positions along the axis of said shaft and having a predetermined angle therebetween, a cylindrical tape guide drum for guiding the record medium about a loop path in conforming relation to the paths of said magnetic heads, means for guiding the tape along an oblique path around the tape guide drum such that the magnetic heads are alternately in scanning relation to the record medium, vertical snychronizing signal circuit means for coupling with one of said heads, and picture and horizontal synchronizing circuit means for coupling with the other of said magnetic heads.

6. A magnetic recording and reproducing system comprising a magnetic medium, a rotary shaft, two rotary magnetic heads mounted at different positions along the axis of said shaft and having a predetermined angle therebetween, a cylindrical tape guide drum for guiding the record medium about a loop path in conforming relation to the paths of said magnetic heads, and means for guiding the tape along an oblique path around the tape guide drum such that the magnetic heads are alternately in scanning relation to the record medium, said magnetic heads having an angle therebetween less than about 360°, a vertical synchronizing circuit means for coupling with one of said heads during angular travel of said one of said heads through an angle equal to said angle between said heads.

7. In a magnetic transducing system, a magnetic record medium for movement in a longitudinal direction and having two magnetic record zones extending longitudinally along the record medium in transversely offset relation, said zones having respective magnetic tracks therein extending at skew angles to the direction of movement of the record medium with the beginning and end of each track being offset in the longitudinal direction an amount substantially greater than the distance the record medium travels in the time of recording of the track, the tracks of said zones being recorded successively in time and the track of one zone immediately following in time a track of the other zone being offset in the direction of movement of the record medium by a distance substantially greater than the distance of movement of the record medium in the interval between recording of the successive tracks to provide for scanning of the tracks of said zones by axially offset rotating heads moving along orbits extending at an oblique angle to the direction of movement of the record medium.

8. A recording and reproducing system comprising a magnetic medium, a rotary shaft, two rotary magnetic heads mounted at different positions along the axis of said shaft and having a predetermined acute angle therebetween substantially greater than zero, a cylindrical tape guide drum for guiding the record medium for movement about a loop path in conforming relation to the paths of said magnetic heads, and said magnetic medium loop path extending about said tape guide drum at an oblique angle to the path of each of said magnetic heads such that the magnetic heads are alternately in scanning relation to the record medium.

9. A transducer system comprising a tape record medium movable along a record medium loop path where the center line of the record moves progressively about an open loop, first and second transducer heads for scanning said record medium at said record medium loop path, means mounting said first and second heads for rotation about an axis extending generally centrally with respect to said record medium loop path with the first and second heads being offset axially from each other along said axis and moving along respective first and second orbital paths about said axis, the path of the center line of the record medium about said loop path extending at an acute angle substantially greater than zero and substantially less than 90° relative to the orbital paths of said heads, the first and second heads tracing respective first and second series of scanning paths in respective first and second zones on the record medium, the scanning paths of said first and second series each extending at an oblique angle to the center line of the record medium and being successively offset in the direction of movement of the record medium, and the first and second heads tracing said first and second series of scanning paths exclusively in said respective first and second zones on the record medium which zones are laterally offset and substantially separate from each other.

References Cited by the Examiner

UNITED STATES PATENTS 2,915,595 12/59 Lyon ............ 178—6.6 XR
2,965,708 12/60 Witt ............ 178—6.6

DAVID G. REDINBAUGH, *Primary Examiner.*